United States Patent [19]
Wyatt et al.

[11] Patent Number: 5,189,281
[45] Date of Patent: Feb. 23, 1993

[54] RETHERMALIZATION CART INDICATOR SYSTEM

[75] Inventors: W. Burk Wyatt; Kevin B. Cundiff, both of Brentwood; Kenneth R. Little, Jr., Nashville, all of Tenn.

[73] Assignee: Aladdin Synergetics, Inc., Nashville, Tenn.

[21] Appl. No.: 567,361

[22] Filed: Aug. 15, 1990

Related U.S. Application Data

[63] Continuation-in-part of Ser. No. 394,204, Aug. 15, 1989, and Ser. No. 471,483, Jan. 29, 1990, abandoned, and Ser. No. 541,129, Jun. 20, 1990.

[51] Int. Cl.$^5$ .............................................. H05B 3/68
[52] U.S. Cl. .................................... 219/386; 219/521; 219/506; 219/453
[58] Field of Search ............... 219/385, 386, 387, 521, 219/453, 506

[56] References Cited

U.S. PATENT DOCUMENTS

| | | |
|---|---|---|
| 1,692,012 | 11/1928 | Wells . |
| 2,710,274 | 6/1955 | Kuehl . |
| 2,953,921 | 9/1960 | Muncheryan ................. 374/150 |
| 3,219,993 | 11/1965 | Schwertz . |
| 3,701,344 | 10/1972 | Walls et al. . |
| 3,781,523 | 12/1973 | Borom ........................... 219/453 |
| 3,826,221 | 7/1974 | Ross ............................. 116/207 |
| 4,005,745 | 2/1977 | Colato et al. . |
| 4,103,736 | 8/1978 | Colato et al. . |
| 4,137,769 | 2/1979 | Parker . |
| 4,203,486 | 5/1980 | Rubberight et al. . |
| 4,270,039 | 5/1981 | Hauser ......................... 219/385 |
| 4,285,391 | 8/1981 | Bourner . |
| 4,323,110 | 4/1982 | Rubbright .................... 219/521 |
| 4,346,756 | 8/1982 | Dodd et al. . |
| 4,565,282 | 1/1986 | Olsson et al. . |
| 4,591,692 | 5/1986 | Wightman . |
| 4,620,941 | 11/1986 | Yoshikawa et al. . |
| 4,757,184 | 7/1988 | Swanson ...................... 219/386 |
| 4,786,773 | 11/1988 | Keefer ...................... 219/10.55 E |
| 4,805,188 | 2/1989 | Parker . |
| 4,846,475 | 7/1989 | Newcomb et al. . |
| 4,933,525 | 6/1990 | St. Phillips ................... 374/149 |
| 4,983,810 | 1/1991 | Balderson ..................... 219/462 |

FOREIGN PATENT DOCUMENTS 2285836 9/1975 France .

OTHER PUBLICATIONS

Aladdin Advanced Meal Systems Walk-In Rethermalization Refrigerator, Nov. 1989.
Aladdin Advanced Meal Systems Control Panel Published Aug. 1989.
Aladdin Advanced Meal Systems Temp-Rite II Excel ©1989.
Aladdin Advanced Meal Systems Temp-Rite II Excell Rethermalization Cart, Nov. 1989.
Aladdin Advanced Meal Systems Temp-Rite II Excel Tray Components, Nov. 1989.
Counselor, vol. 10, Issue 1, 1988.
Aladdin Advanced Meal Systems Dome Storage Racks, Nov. 1989.
Aladdin Advanced Meal Systems Rethermalization System, Oct. 1988.

Primary Examiner—Teresa J. Walberg
Attorney, Agent, or Firm—Banner, Birch, McKie & Beckett

[57] ABSTRACT

A rethermalization cart having at each food tray positions therein a pair of electrical heater pads positioned to controllably heat separate food servings on a food tray positioned in the cart. Mounted in each pad is a hollow dowel of thermochromic material and surrounded by a heat conductive sleeve. The color of the material is readily visible from outside of the cart to indicate whether the food associated with that pad is safely heated. A light bulb is connected to the electrical heating circuit of the pad so that when the circuit is "on" the bulb is lit. When lit, the bulb shines through the hollow dowel. The cart, when in position in a refrigerator unit, is plugged into an electrical receptacle in the unit. When the cart is moved in or out of the unit to access the trays, the cart becomes unplugged. Although the light bulb is thereby extinguished, if lit, the thermochromic dowel still indicates by its color the thermal condition of the food.

11 Claims, 4 Drawing Sheets

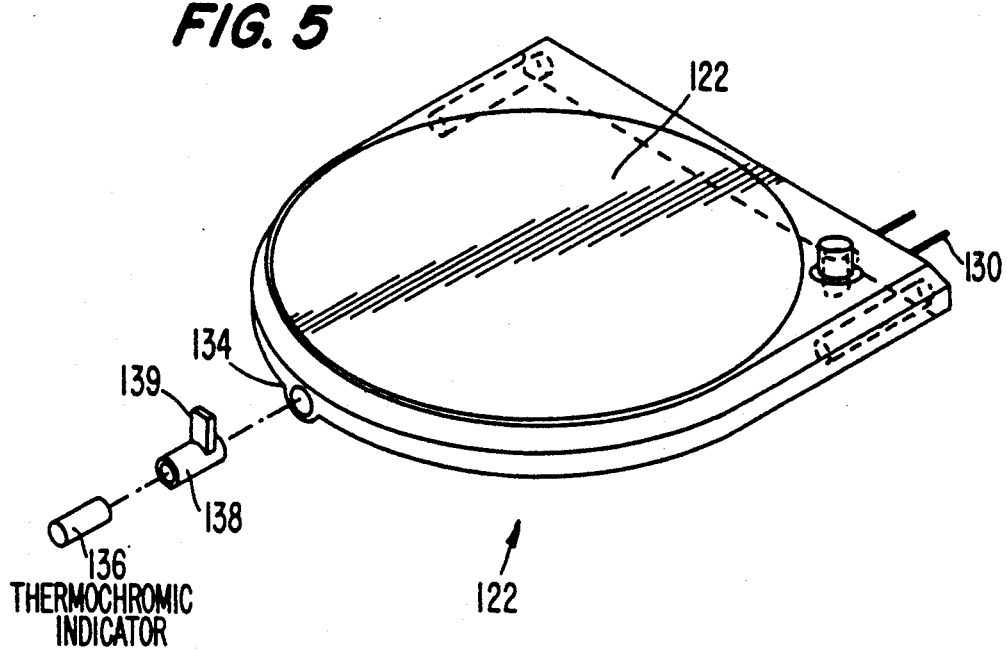
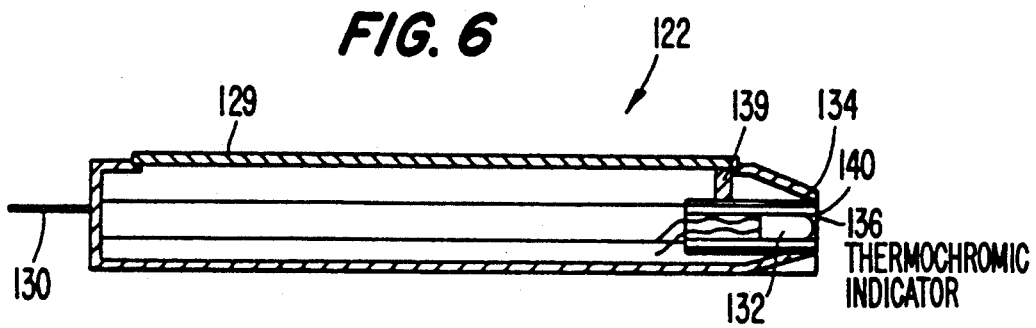

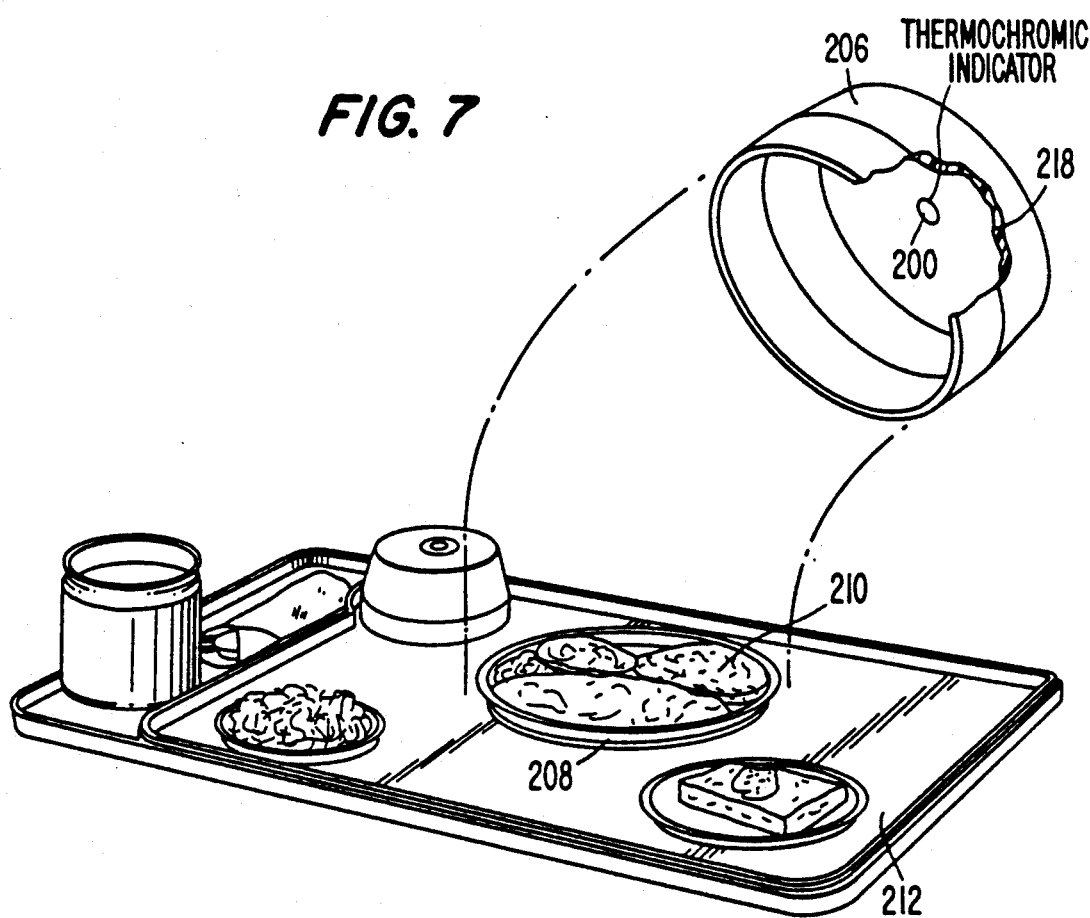
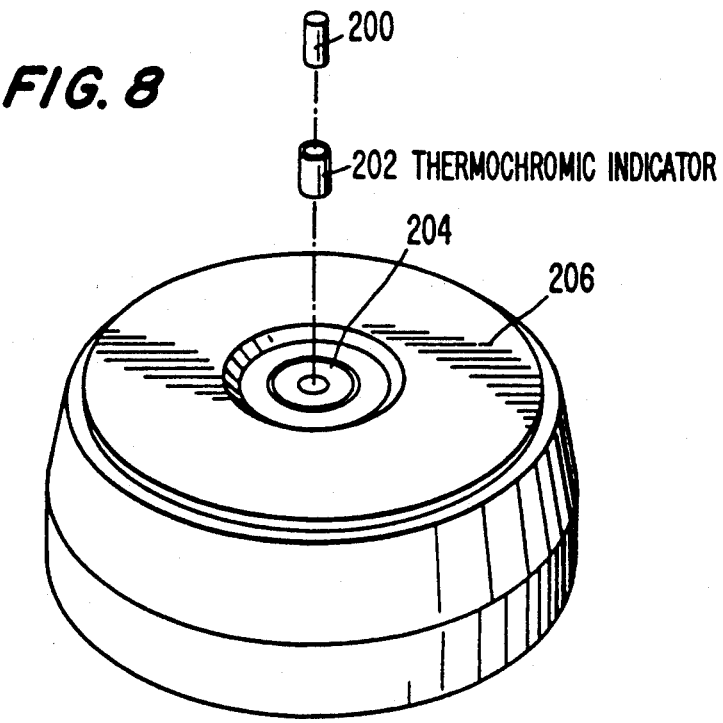

RETHERMALIZATION CART INDICATOR SYSTEM

CROSS-REFERENCE TO RELATED APPLICATIONS

This is a continuation-in-part (CIP) of copending applications Ser. No. 07/394,204 ('204), filed Aug. 15, 1989, Ser. No. 07/471,483 ('483), filed Jan. 29, 1990, now abandoned, and Ser. No. 07/541,129, filed Jun. 20, 1990, and which in turn is a CIP of the '204 and the '483 applications. These applications and any other applications, patents or other publications mentioned anywhere in this disclosure are hereby incorporated by reference in their entireties.

BACKGROUND OF THE INVENTION

The present invention relates to "active" food service systems wherein individual portions of precooked food are supported on trays within movable carts. The carts are placed in a chilled environment to store the food in a chilled state. Selected foods on the trays are rethermalized, or heated to hot serving temperatures, in the cart, while other portions of the foods on the trays remain in the chilled state. The present invention also relates to "passive" food service systems wherein the hot cooked food is served up on plates or trays, covered and then transported to the intended user.

A rethermalization system is a food service system wherein food is cooked or precooked and then chilled in bulk. The food is divided in individual portions and stored in a chilled state until it is reheated. The United States Food and Drug Administration (FDA) guidelines specify that the chilled and stored temperature most be 40° F. or less. A short time before the food is served, the food which is to be served hot is brought to a safe reheated temperature; that is, it is rethermalized. FDA guidelines specify that a safe reheating temperature is 165° F. or greater.

One known rethermalization concept is the Temp Rite II System available from Aladdin Synergistics, Inc. of Nashville, Tenn., and is disclosed at least in part in U.S. Pat. No. 4,285,391 to Bourner. The Temp Rite II System uses three separate thermostatically controlled heaters on each cart shelf whereby each heater supplies a particular wattage depending on the type and density of the food to be heated and the dishware used. The Temp Rite II tray has compartments each separated from the others, and a compartmentalized insulated cover is placed over the food compartments thereby isolating the hot areas from the cold areas.

After the trays are assembled on a cold tray line and then protected by the insulated cover tops, the assembled trays are placed on the cart shelves. The trays can be placed in the cart in a first position or in a 180° reverse position. In the first position, the three hot food compartments align precisely with the three heating elements and the cover automatically engages an activator switch mounted on the side of the cart for future heating. If the tray is placed in the reverse position, however, the three hot compartments will not be positioned over the heating elements and the cover will not engage the activator switch. As a result, all the food on the tray remains cold. The loaded carts are then rolled into a rethermalization refrigerator where the meals are held at 40° F. The activator switch turns the three elements either "on" or "off" and does not individually control any one heating element.

Another very recent system is the Temp Rite II Excel System also available from Aladdin Synergetics, Inc. and disclosed at least in part in the '204 application. It is basically a cafeteria pellet system which utilizes separate hot dishes having separate insulated covers or domes. This system includes a unique separate heating pad arrangement. Each pad is a modular unit and can be replaced if necessary without replacing the other pads on the same tray extrusion. Each pad further incorporates two circuits—a low wattage primary and a higher wattage secondary—which allow for the heating over a wide range and combination of different food densities. A dome sensing magnetic switch determines the presence or absence of the insulated dome over the pad. If the dome is present the pad will be activated to permit heating of the food at the desired time. If the operator wants to keep certain foods cold, the dome can be removed for preventing activation of the pad. Other examples of food service rethermalization systems wherein the heating elements are incorporated into shelves within the service carts are shown in U.S. Pat. No. 4,346,756 and 4,323,110.

Thus, with the Temp Rite II carts, meals are assembled cold using advanced prepared foods then held in the carts in dedicated refrigerators. These refrigerators can be either individual roll-in units or central walk-in units for decentralized or centralized application. The centralized rethermalization system accommodates many carts at the same time and is large enough to define a walk-in room. An external control panel has automatic programmable timers which activate the rethermalization sequence in the carts. The carts automatically engage into special electrical receptacles in the back of each roll-in unit, either single bay or double bay units. The walk-in units include modular floor mounted electrical receptacles for automatically engaging in the carts. Immediately before serving, the meals are heated within their insulated enclosures and within the refrigerator and without rehandling. The insulated technology of this system allows each food item to be kept at its proper hot or cold temperature until served. The decentralized option puts the meal service close to the patient by locating the system in a floor galley. The decentralized option utilizes a roll-in refrigerator designed especially for use with these carts. This refrigeration unit maintains the inside air temperatures between 38° and 40° F. before, during and after rethermalization.

As explained in the '204 application, the cart preferably has individual heating pads, one for each of the two separate hot food areas of the tray. Each pad has a built-in light providing a visual indication of whether the heaters are receiving electricity and actually heating. This allows the maintenance personnel and operators to determine whether the heater's heating elements are functioning properly. These light bulbs, however, last only a few weeks while the rest of the cart typically lasts for many years. Thus, when a single light bulb burns out it has been necessary to dispose of the entire heating pad unit at great expense. Even if the pad were designed so that the light bulb could be easily replaced, the time (and thus cost) required for a mechanic to replace them is not insignificant. It is also difficult to determine whether it is the heating element which is not functioning or the light bulb.

Further, these lights are typically not visible during the rethermalization process. When the carts are inside of a walk-in refrigerator they are lined up right beside each other. The operators typically are only able to see the handle part or back of the cart and not the sides since the sides are adjacent and directly facing one another. The lights which are positioned visible only at the sides of the carts thus cannot be seen. For the roll-in refrigerators there are adjacent refrigerator walls on either side which also prevent the lights from being seen, as maintenance personnel or operators cannot stick their heads in far enough to see the lights. Thus the only way to determine whether the unit is heating is to place one's hand on top of the heating element. There are two problems to this. First and obviously, the tester can get burned. Second, there is often a dish on top of the unit so that it cannot be conveniently accessed.

A further problem with this electrical bulb indicator is that once the cart is removed from the refrigerator unit or when the power goes off after the rethermalization cycle is complete, the light is extinguished. Therefore there is no visual indicator of whether the meal is actually heated, the heater has worked or is working properly and so forth. The only way to determine whether there was a successful rethermalization is to actually pull the meal out and look at it to determine whether it is hot enough. In other words, if it is in a roll-in refrigerator the operator cannot see the light so he rolls it out to where he can see it but then the power is disconnected so the light goes off. Thus, without actually taking the meal out and testing it cannot be determined whether sufficient heating thereof has taken place.

A preferred heating element is a two-speed heating element and the light is placed across only one of the electrical lines either the high or the low speed, and preferably the high speed. Thus when the heater has heated to its maximum and is about fifteen minutes into the rethermalization cycle, the heater goes into its low speed or maintenance mode and the light goes out. One who is trouble shooting or checking the unit might thus assume that the heater has actually burned out.

The walk-in rethermalization system typically has a rethermalization cycle of only thirty-six minutes for heating the meals in the cart. When this period has elapsed the control panel on the outside of the unit beeps to indicate the completion of this cycle. The operators then enter the cooler and pick up the carts. A number of banks of carts are typically held in the cooler and the operators may not remember which bank of carts was finished. Since the electricity to the carts is "off" now, the indicator lights are extinguished and there is no immediate indicator alerting the operators as to which of the carts have been properly heated.

The above-described rethermalization system(s) is an "active" system wherein heating of the food takes place with the food in position on the tray. Another food service system also particular useful in institutional settings is a "passive" system wherein the food is heated before being placed on the tray. It is plated hot onto the insulated tray and then covered with an insulating cover to keep it hot while it is transported to the intended consumer. An example of such a system is the Temp Rite I System, another Aladdin food handling system. For this system the plates are heated, the food is heated up on steam tables and the hot food plated onto the hot plates. An insulated cover is placed over the plated food resting on the insulated tray base. This is a passive system; there is no rethermalization of the meal, no electricity is used for the tray system, and the insulation provides a heat maintenance.

The trays, after they have been plated up and covered in the passive system or rethermalized in the active system, are then transported to the location of the intended consumers and may wait twenty, thirty or more minutes before they are actually served or consumed. In satelliting operations the carts and thus trays may also be transported outside where their temperature can be affected by the hot or cold environment. Since the FDA requires that hot food to be edible and safe must be in a safe zone of at least 140° F., the nurse, hostess or other server must at least spot probe the food with some type of device, such as a thermocouple or a thermometer, to determine whether it is hot enough. In other words, he or she must lift the cover and stick a food thermometer into the food to spot check to make sure that the meals are still hot. As can be appreciated, this is not only a time consuming and cumbersome process but has sanitation aspects to it as well.

SUMMARY OF THE INVENTION

Accordingly, it is a principal object of the present invention to provide a rethermalization cart which indicates whether the heating elements thereof have functioned properly even after the heating cycle is completed and/or the cart has been removed, repositioned or otherwise electrically disconnected from its refrigeration unit.

A further object of the present invention is to provide a system for active and/or passive food service systems which allows a determination to be made as to whether previously heated food on a serving tray is still at a safe hot temperature immediately prior to serving and without having to stick a thermometer or other device into the food.

Directed to achieving these objects two improved food service indicator systems are herein provided. Both include effective, convenient non-electrical temperature indicators which provide immediate indications of whether the food service system or one or more aspects thereof is at a proper temperature. The first is a unique adaptation of the Temp Rite II Excel rethermalization cart. Each of the heating pads thereof is constructed to have mounted therein, in the forward or nose portion thereof, a dowel of thermochromic material especially adapted, chosen and mounted within a metal heat conductive sleeve. When the heating unit has reached a certain temperature, such as 150° F., the dowel member changes color, such as from dark blue to bright orange. The sleeve provides an efficient heat conductive structure allowing the dowel to be more completely heated by the heating unit (or heated food). The dowel is hollow and open at both ends and is positioned so that the light bulb therein when lit shines through it.

A second embodiment of this invention incorporates this same non-electrical, temperature indicator technology into the serving tray system itself. More particularly, this (or a similar) sleeve and thermochromic dowel material are flush mounted axially through the lift knob of the insulated dome covering the hot food dish. The dowel is visible from the top of the dome and thus the server or uniquely the intended consumer can determine, without lifting the dome and/or sticking any instrument into the food, whether the covered food is at a safe hot temperature.

In other words, provided herein is a food service system including a tray, a hot food dish, and an insulated dome. Hot food is served onto the dish, the dome is preheated, the food carrying dish is set on the tray, the preheated dome set over the dish, and the tray system delivered to the intended consumer. A thermochromic member disposed in a heat conductive sleeve is mounted in the lift knob of the dome. Thus, without lifting the dome, the servier and/or the consumer can readily determine from the color of the member whether the covered food is still at a safe heating temperature.

Other objects and advantages of the present invention will become more apparent to those of ordinary skill in the art from the foregoing description taken in conjunction with the accompanying drawings.

BRIEF DESCRIPTION OF THE DRAWINGS

FIG. 5 is a perspective view showing one of the heating pads of FIG. 4 in isolation and with the heat indicator assembly thereof shown in an exploded relation thereto.

FIG. 6 is a cross-sectional view of the pad of FIG. 5.

FIG. 7 is a perspective view of a tray indicator system of the present invention with the insulated dome thereof shown lifted off and with portions thereof broken away.

FIG. 8 is a top perspective view of the dome of FIG. 7 with the temperature indicator elements shown in exploded relation thereto.

DETAILED DESCRIPTION OF PREFERRED EMBODIMENTS OF THE INVENTION

Figure 1:
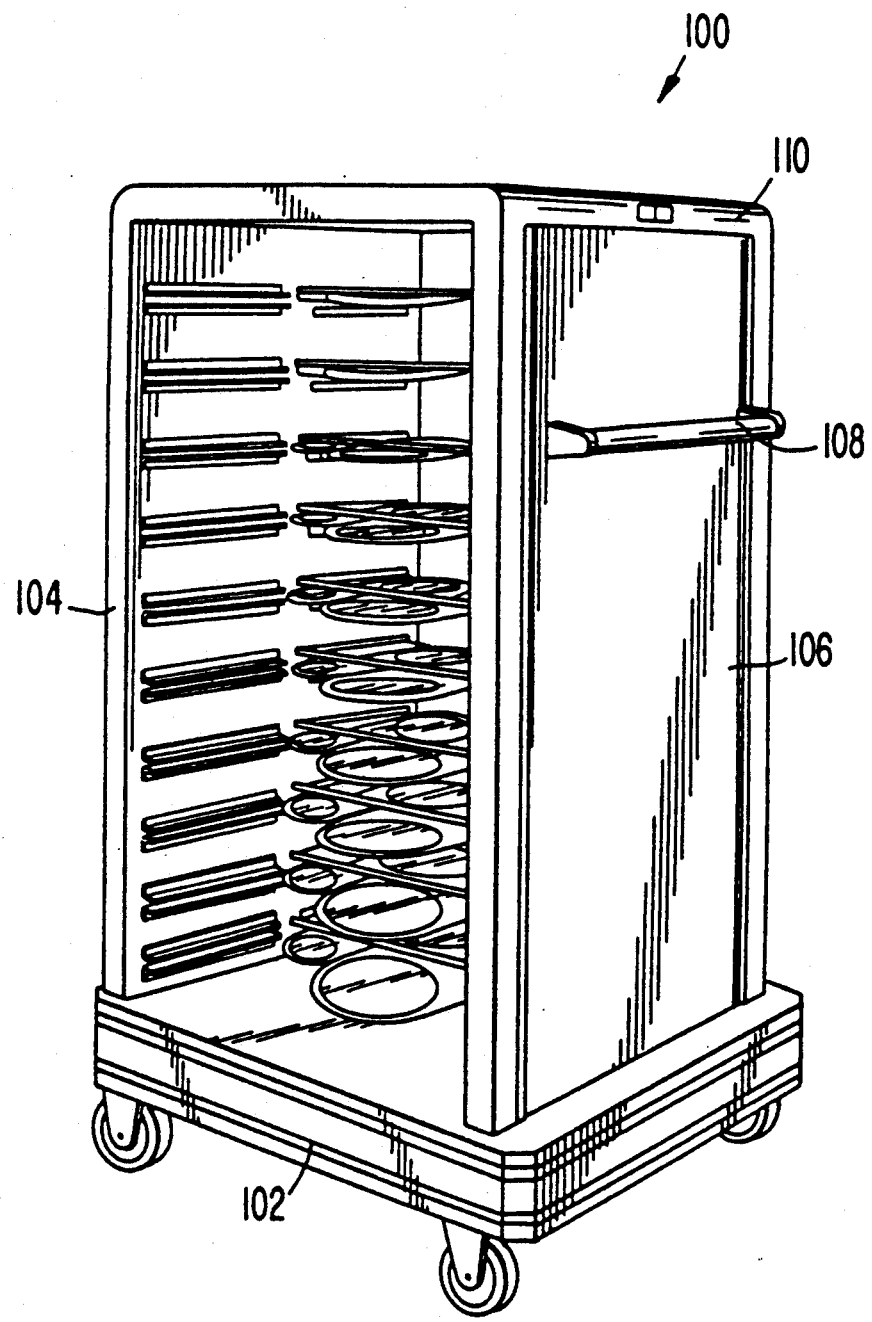
FIG. 1 is a perspective view of a rethermalization cart of the present invention.
Figure 2:
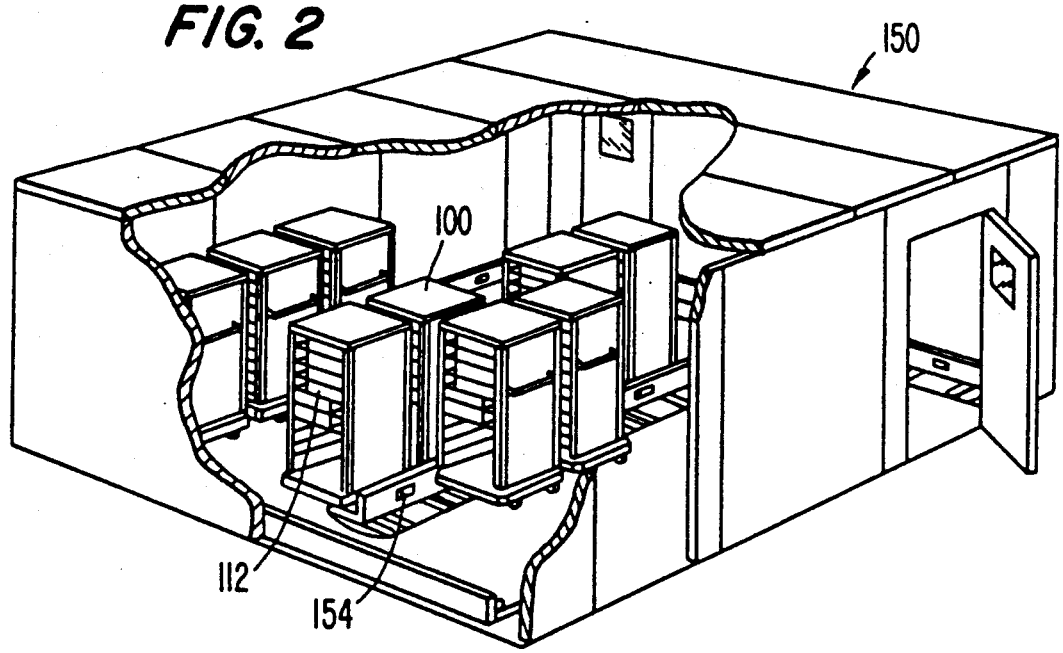
FIG. 2 is a perspective view of a roll-in refrigerator unit, having portions thereof broken away to show internal components, with a plurality of the rethermalization carts of FIG. 1 operatively in position therein.

A rethermalization cart of the present invention is shown generally at 100 in FIG. 1, and represents a Temp Rite II Excel cart, modified with the heat indication system of the present invention. This cart includes a wheeled base shown generally at 102, a pair of side (or front) upright panels shown generally at 104 and 106, at least one having a handle 108, and a rounded dome top shown at 110. Both the front and back (or sides) are open providing access from both sides to the interior of the cart 100. A plurality of vertically spaced shelf locations are defined at both open sides of the cart 100 for insertion and removal of covered food service trays 112 (FIG. 2). Examples of trays 112 are usable in this cart are disclosed in the parent applications, and examples of food service dishes which can be used on the tray of this system are those disclosed in the '483 application.

Figure 4:
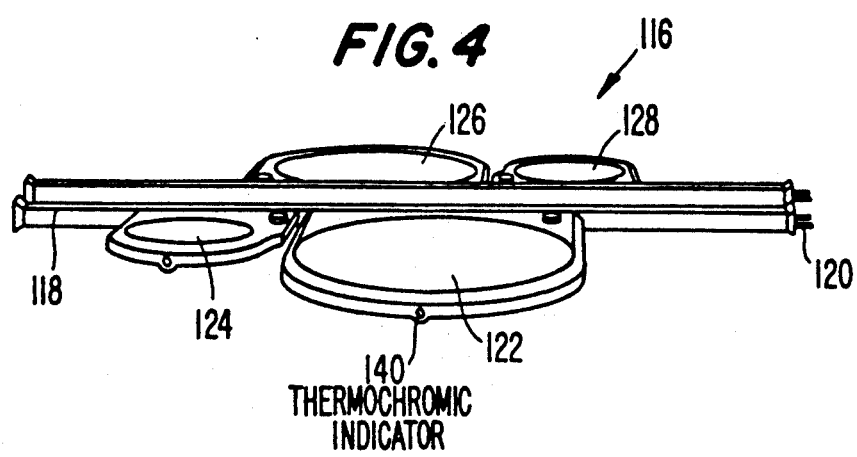
FIG. 4 is a perspective view showing, in isolation, a heating bar element of the rethermalization cart of FIG. 1.

One of the heater element assembly bars assemblies of this cart 100 is shown in isolation in FIG. 4 generally at 116. It includes a T-shaped heater element support bar 118 with electrical connections 120 at an end thereof and cantilevered heater modules or heating pads 122, 124, 126, 128 projecting in both directions out from the bar. The pads 122, 124, 126, 128 are essentially of the same construction on each side of the bar 118, one (122 and 126) being larger than the other (124 and 126) to accommodate a single large hot food plate and a smaller hot food plate on each tray. One of these heater pads 122 is shown in isolation and in perspective in FIG. 5 and a cross-section thereof is shown in FIG. 6. The pad 122 has a top heating element or metal heater plate 129 and electrical pins 130 at its rear end providing electrical connection with wiring in the support bar 118. While the plates 129 of the larger entree pads 122, 126 are heated to 220° to 240°, the plates of the smaller soup pads 124, 128 are heated to 240° to 280°.

Referring to FIGS. 4–6, despite the previously-discussed problems with the light bulb 132 it remains in the preferred heater pad design to give an instantaneous diagnostic determination of whether the heater is functioning properly. Mounted in the front nose 134 of each pad 122 and surrounding the bulb 132, however, is a dowel 136 of resin or plastic thermochromic material enclosed within a heat conductive sleeve 138. The dowel 136 is hollow and open at both ends, and the light bulb 132 is positioned therein to shine out the end 140 thereof. The dowel 136 is approximately 0.5 (or 0.87 or 0.75) inch long, has an inner diameter of 0.125 inch and an outer diameter of approximately 0.255 inch. A preferred dowel material is Type 47 MA-013-X Chromic AS, #2G (blue or orange), MA013X ABS material, which starts changing color at 111.2° F. and is completely orange at 136.4°. Examples of other thermochromic, visual temperature indicating materials and applications thereof are disclosed in U.S. Pat. Nos. 1,692,012, 2,710,274, 3,219,993, 3,701,344, 4,137,769, 4,270,039, 4,592,692, 4,620,941, 4,805,188 and 4,846,475. Further examples of known uses of thermochromic materials are those actuated by body heat such as the "mood rings" and those used in certain stress tests as on children's foreheads or which are held in the hand, and those used in some necklaces sold at theme parks. Another example is a known doll provided with these different materials in her face and an applicator which can be dipped in cold water and touched against the doll's face at various areas thereof to turn it various colors.

The sleeve 138 in turn has the same length dimensions as the dowel 136, a thickness of approximately 0.04 inch, an inside diameter of approximately 0.25 inch and is formed out of aluminum. The dimensions and construction of the sleeve 138 are important. The thicker the sleeve 138, the longer it takes to conduct the heat and thus the color indicated timing of the dowel 136 can be delayed. When the metal is thicker, however, it retains the heat longer thereby acting as a heat sink. The thickness(es) of the sleeve 138 will then be selected to match the desired temperature range for the rethermalization temperature indication system. The sleeve 138 efficiently conducts heat from the heating element of the pad(s) 122 to the dowel 136 and thereby provides for use over an increased heat range. The sleeve 138 can also preferably be provided with a small extension 139 so that it actually touches the heating element (129) of its pad and thereby provides an extra conductivity path. Referring to FIGS. 5 and 6, extension 139 is an aluminum or other metal piece formed separately or integrally with the sleeve 138 and making physical contact with the bottom edge of the metal heater plate. The plastic structure of the heater pads 122 acts as an insulator and does not efficiently conduct the heat to the dowel 136. For example, if the cart 100 (with dowels 136 and without the sleeves 138) is transported outside on a hot summer day or is otherwise in a hot environment the dowel can be heated to a temperature such as 90° or 95° which could cause it to assume a hot zone color thereby providing a false indication that the heater pad (122) had been heated. The sleeve 138 allows for a dowel 136 to have a higher temperature range and to still properly change its colors within the needed time period. The sleeve's primary function is to distribute the desired temperature evenly through the indicator dowel 136. For example, without the sleeve 138, the inside or back part of the dowel 136 (left end in FIG. 6) turns bright orange due to the heating of the plate but the visible or front part (right end in FIG. 6) remains black due to the ambient temperature of the refrigerator. With the sleeve, however, the entire dowel will be bright orange under the previous circumstances. The sleeve also allows the dowel to keep its orange color for a longer period of time.

Thus, the light bulb 132 has been retained and pushed through the dowel and shines, when lit, through the open end 140 of the dowel 136. However, now when the electricity has been cut off, the dowel 136 retains for some period of time its orange or bright orange color. In other words, with a preferred dowel material, the dowel 136 starts off with a dark blue or black color when cold and then turns to a very bright orange when hot. With the electricity "off" an operator or maintenance person can thus walk up to the cart 100 and determine whether the cart has been heated. That is, the cart can be pulled out of the walk-in refrigerator unit as shown generally at 150 in FIG. 2 or a roll-in unit as shown in FIG. 1 of the '204 application, and the hospital or other assistants can go through the menus and spot check the meals to determine whether the proper plate areas has been heated.

As the meal is being heated there is a time delay in the change of the color of the dowel 136. Although the dowel 136 begins to change color at 120° F. (for example) this does not happen until the food attains a temperature of about 140°. The 140° temperature is a critical temperature as the FDA requires that food to be safe and edible must be in a safe zone of at least 140°. Thus, the dowel 136 changes over when the food is at approximately 140°; it changes from dark blue to bright orange around the periphery where it is closest to the conductive sleeve 138 and it has a black dot in the middle representing the hollow open end 140. Then when the dowel 136 is at a temperature of 150° F. it has turned completely bright orange. The indicator (dowel 136) in the pad 122 does not, however, necessarily indicate whether the system is on a high speed or a low speed. It is within the scope of the present invention though to provide two different dowels and sleeve assemblies for each pad, each adapted for a different one of these speeds or wattages.

Figure 3:
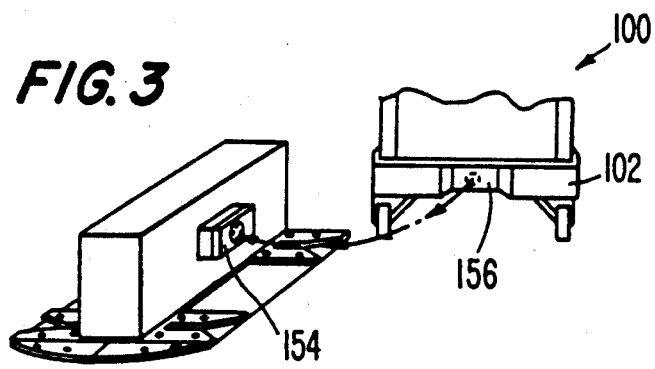
FIG. 3 is a perspective view showing the connection of the rethermalization cart of FIGS. 1 and 2 to a floor mounted electrical receptacle of the refrigerator unit of FIG. 2.

FIG. 3 shows in a known walk-in refrigerator 150 the receptacle 154 and the connection 156 to the cart 100. The cart 100 loaded or partial loaded with food-laden trays 112 which have gone through the rethermalization cycle is disconnected from the plug 154 in the chilling unit either a walk-in refrigerator 150 (FIG. 2) or roll-in refrigerator, the colors of the dowels 136 are compared with the menu to make sure that the foods have been properly heated, the trays 112 pulled off of the cart 100 and the trays are transported to the hospital patient on other intended consumer. Some time may pass though before the tray 112 is physically delivered to the intended consumer and he is ready to eat. Is the heated food still hot enough to be served and eaten?.

A similar dowel 200 and sleeve 202 arrangement built into the knob 204 of the insulated dome 206 protectively covering the hot food plate 208, as shown in FIG. 7, provides a quick and reliable answer to that question. The server or intended consumer can quickly determine without lifting the dome 206 or sticking any instrument (not shown) into the food 210 whether the food is still at a proper hot temperature by noting the color of the indicator dowel. This dowel 200 is not hollow or open like dowel 136 since there is no light (132), but rather preferably is a solid member. This dome indicator technology can also be adapted to indicate that the chilled food plates are still in a chilled condition, such as below 40° F.

Thus, after the meal has been heated, the cart 100 pulled out of the refrigerator and taken up the hall where it sits for twenty or thirty minutes, the nurse, server or hostess can pull the tray out, spot check the tops of the dome(s) 206 on the tray and immediately determine whether the meal is still hot or whether it has been sitting too long. If the dowel 200 in the dome 206 is black or dark blue then the food is below 140° and is not safe for eating. It has been sitting too long and is thus not delivered to the patient. The meal may also have been sitting in the patient's room for a while after having been delivered thereto before he eats it. The patient or consumer, once he has become aware of his new technology, can also by himself and without any equipment determine whether his meal is still safe to heat.

This heat or temperature indicator dome 206 can also be used in a passive type of system such as the Temp Rite I Pellet System in wide use in hospitals today. This system includes the plastic insulated dome 206 positionable over the food plate 208 held in an insulated base 216. The domes 206 before being positioned over the heated food 210 can uniquely be according to this invention be preheated or tempered in a heat cabinet (not shown) to at least 130° F. to help maintain the heat in their novel wax filling 218. Thus, instead of the meal 210 being able to retain heat for twenty-five minutes it can remain hot for a longer period of time, forty-five minutes, for example. The dowel 200 and sleeve 202 are carefully selected and constructed to be calibrated to indicate the temperature of the hot food spaced a number of inches beneath them and not in direct contact with them.

The preheated dome 206 is placed on top of the hot meals 210 that have previously been plated in the kitchen and these domes and meals are transferred to the floor where they can sit for forty-five minutes, for example. If the dowel 200 is still orange the meal is safe to eat. On the other hand, if it is changed to dark blue then it is too cold to be served and eaten. Although the indicator dowel 200 in the preheated dome 206 would indicate a hot temperature for a short period of time of five minutes, for example, after preheating and without a hot meal 210 beneath it constantly energizing the sleeve 202, the dowel 200 would soon turn blue. The fitting hole in the top of the dome 206 is sized so that the sleeve 202 and dowel 200, which are approximately three-quarters of an inch long, are friction fit or press fit into it, and form a seal with the surrounding plastic of the dome 206. The dowel 200 is flush at the bottom side of the dome 206 as shown in FIG. 7 and flush on the top side of the dome and inserted through the center of the dome knob 204.

This rethermalization cart 100 design also provides for easy trouble shooting of a cart. The cart is first loaded with trays 112 with switch actuating covers, or the trays with the switches thereon actuated as shown in the '129 application. The carts are inserted into the refrigerator unit such as 150, the test switch is pushed and the test conducted for about five minutes. The cart 100 is then removed from the rethermalization unit and the nose 134 of each of the heater pads 122 is observed to determine quickly and without touching the heater elements whether the pads are good or bad (and what speed they are working at). The pads 122 need not be observed immediately since after removing the cart from the unit or after disconnecting it or after the completion of the cycle there will be sufficient residual heat in the pad for approximately twenty minutes to provide a visual temperature indication.

Numerous characteristics and advantages of the invention have been described in detail in the foregoing description with reference to the accompanying drawings. However, the disclosure is illustrative only and the invention is not limit to the precise illustrated embodiments. Various changes and modifications may be effected therein by persons skilled in the art without departing from the scope or spirit of this invention.

What is claimed is:

1. A rethermalization heat indicator system, comprising:
   a rethermalization cart having a generally open cart side;
   an electrical heater pad supported in said cart and positioned for thermal contact with a food carrying member in said cart;
   switch means for electrically switching said pad between different heat actuation states; and
   non-electric, temperature indicator means for indicating the temperature of said pad, said indicator means including a thermochromic member and outer heat conductive sleeve means surrounding said thermochromic member for conducting heat from said heating pad to said member, said member and said sleeve being disposed in said pad so that the thermally changeable color of said member is visible from outside of said open cart side.

2. The system of claim 1 wherein said heater pad has a forward edge and said member is horizontally positioned and has an end thereof whose color is visible at said forward edge.

3. The system of claim 1 wherein said member has a safe heat zone color only when said pad is at least 120° F.

4. The system of claim 1 wherein said cart includes a light associated with said pad, said light being lit only when said switch means is in an "on" position and said pad is being heated.

5. The system of claim 4 wherein said member is shaped as a hollow cylinder and said light is positioned such that when lit it is visible through said cylindrical member.

6. A rethermalization indicator system, comprising:
   a rethermalization cart;
   an electrical heater pad supported in said cart and positioned for thermal contact with a food carrying member in said cart;
   a hollow dowel of thermochromic material positioned in said pad so as to indicate, by the color thereof and from generally outside of said cart, the approximate temperature of food on the food carrying member when in thermal contact therewith; and
   light means for indicating through said dowel whether said pad is electrically actuated.

7. The system of claim 6 wherein said light means includes a light bulb disposed below said pad and positioned, when lit, to shine visibly through said dowel.

8. A rethermalization system, comprising:
   a refrigeration housing having an electrical receptacle;
   a cart having an electrical contact and at least one electrical heating pad for supporting a food dish, said electrical contact when connected to said electrical receptacle, with said cart in said housing, allowing said pad to be energized to thereby heat food in thermal contact therewith; and
   thermochromic indicating means in said pad for indicating the approximate temperature of said pad with said electrical contact disconnected from said electrical receptacle;
   wherein said pad has a heating plate and said indicating means includes a thermochromic member, a heat conductive sleeve surrounding said member and a metallic extension physically connecting said heating plate and said sleeve.

9. The system of claim 8 wherein said cart includes a light attached to said pad and lit only when said electrical contact is operatively connected to said electrical receptacle and said pad is electrically actuated.

10. The system of claim 9 wherein said indicating means includes a hollow thermochromic member and said light is positioned relative to said pad to be visible, when lit, through said hollow member.

11. The system of claim 8 further comprising said cart defining a first rethermalization cart, and a second rethermalization cart operatively positionable in said refrigeration housing when said first rethermalization cart is operatively positioned therein.

* * * * *